(12) United States Patent
Birch et al.

(10) Patent No.: US 12,406,055 B2
(45) Date of Patent: Sep. 2, 2025

(54) SYSTEM AND METHOD FOR IDENTIFYING AND REDIRECTING INCOMING UNAUTHORIZED DATA ACCESS REQUESTS

(71) Applicant: BANK OF AMERICA CORPORATION, Charlotte, NC (US)

(72) Inventors: Christopher Daniel Birch, Tega Cay, SC (US); Sophie Morgan Danielpour, Durham, NC (US); Susan R. Hart, Addison, TX (US); Son Huynh, Charlotte, NC (US); Tyler Keith Prothro, Waxahachie, TX (US); Shannon Sabina Rolinger, Pineville, NC (US); Amado Jose Martinez Suarez, Addison, TX (US); Stephen Jack Williams, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 342 days.

(21) Appl. No.: 17/984,921

(22) Filed: Nov. 10, 2022

(65) Prior Publication Data

US 2024/0160722 A1 May 16, 2024

(51) Int. Cl.
- *H04L 29/06* (2006.01)
- *G06F 21/45* (2013.01)
- *G06F 21/53* (2013.01)

(52) U.S. Cl.
CPC ............. *G06F 21/53* (2013.01); *G06F 21/45* (2013.01); *G06F 2221/034* (2013.01)

(58) Field of Classification Search
CPC ..... G06F 21/53; G06F 21/45; G06F 2221/034
See application file for complete search history.

(56) References Cited

U.S. PATENT DOCUMENTS

| | | | |
|---|---|---|---|
| 8,856,909 B1 * | 10/2014 | Chickering | H04L 63/20 |
| | | | 726/10 |
| 9,172,705 B1 * | 10/2015 | Kong | H04L 67/01 |
| 10,055,723 B2 | 8/2018 | Buchholtz et al. | |
| 10,318,954 B1 | 6/2019 | Gailloux et al. | |
| 10,332,214 B2 | 6/2019 | Freeman | |
| 10,580,049 B2 | 3/2020 | Graylin | |

(Continued)

FOREIGN PATENT DOCUMENTS

| | | | | |
|---|---|---|---|---|
| WO | WO-0208870 A2 * | 1/2002 | | G06F 21/78 |
| WO | WO-2013012304 A1 * | 1/2013 | | G06F 21/70 |

*Primary Examiner* — Shawnchoy Rahman
(74) *Attorney, Agent, or Firm* — Moore & Van Allen PLLC; Anoohya Yarlagadda

(57) ABSTRACT

Embodiments of the present invention provide a system for identifying and redirecting incoming unauthorized data access requests. The system is configured for continuously monitoring one or more incoming data access requests from one or more sources, identifying that a data access request of the one or more incoming data access requests is an unauthorized request, redirecting the data access request to a controlled environment, performing one or more actions in the controlled environment to capture one or more interactions associated with the data access request within the controlled environment, and automatically generating one or more controls to secure a real-time environment based on the one or more interactions captured within the controlled environment.

20 Claims, 5 Drawing Sheets

(56) References Cited

U.S. PATENT DOCUMENTS

| | | |
|---|---|---|
| 10,762,579 B2 | 9/2020 | Riechers et al. |
| 11,107,056 B2 | 8/2021 | Lee |
| 11,132,689 B2 | 9/2021 | Riechers et al. |
| 11,195,182 B2 | 12/2021 | Ozvat et al. |
| 11,222,330 B2 | 1/2022 | Dua |
| 11,227,284 B2 | 1/2022 | Safak |
| 11,301,840 B1 | 4/2022 | Smith et al. |
| 11,301,841 B2 | 4/2022 | Ko et al. |
| 2010/0125510 A1 | 5/2010 | Monahan et al. |
| 2010/0271173 A1* | 10/2010 | Aikawa .................. G07C 9/257 340/5.52 |
| 2011/0321139 A1* | 12/2011 | Jayaraman .............. G06F 21/53 726/4 |
| 2017/0168782 A1* | 6/2017 | Boyd .................... G06F 40/106 |
| 2018/0150816 A1 | 5/2018 | Liu et al. |
| 2018/0293562 A1 | 10/2018 | Squire et al. |
| 2019/0034900 A1 | 1/2019 | Lo et al. |
| 2022/0051245 A1 | 2/2022 | Riechers et al. |
| 2022/0253843 A1 | 8/2022 | Gleeson et al. |
| 2023/0089920 A1* | 3/2023 | Post .................... H04L 63/1416 726/5 |

\* cited by examiner

SYSTEM AND METHOD FOR IDENTIFYING AND REDIRECTING INCOMING UNAUTHORIZED DATA ACCESS REQUESTS

BACKGROUND

There exists a need for a system that identifies and redirects incoming unauthorized data access requests.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for identifying and redirecting incoming unauthorized data access requests. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention continuously monitors one or more incoming data access requests from one or more sources, identifies that a data access request of the one or more incoming data access requests is an unauthorized request, redirects the data access request to a controlled environment, performs one or more actions in the controlled environment to capture one or more interactions associated with the data access request within the controlled environment, and automatically generates one or more controls to secure a real-time environment based on the one or more interactions captured within the controlled environment.

In some embodiments, the present invention identifies that the data access request is the unauthorized request based on data received from one or more third party systems, wherein the data comprises information associated with compromised authentication credentials in one or more security data breaches. In some embodiments, the present invention identifies that the data access request is the unauthorized request based on determining that data access request is initiated from an anonymous Internet Protocol address.

In some embodiments, the present invention identifies that the data access request is the unauthorized request based on determining that data access request is initiated from a known compromised proxy service.

In some embodiments, the present invention captures telemetry data associated with the data access request, wherein the telemetry data comprises at least one of device cookies, operating system, screen resolution, browser information, Internet Protocol address, latitude and longitude data, and a Media Access Control (MAC) address associated with the data access request.

In some embodiments, performing the one or more actions comprises determining a type of the data access request, instantaneously generating, via an artificial intelligence engine, fictitious data based on the type of the data access request, and providing the fictitious data to the data access request within the controlled environment.

In some embodiments, the present invention instantaneously generates the controlled environment that has same operational functionalities and visual functionalities as that of the real-time environment, in response to identifying that the data access request is the unauthorized request.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
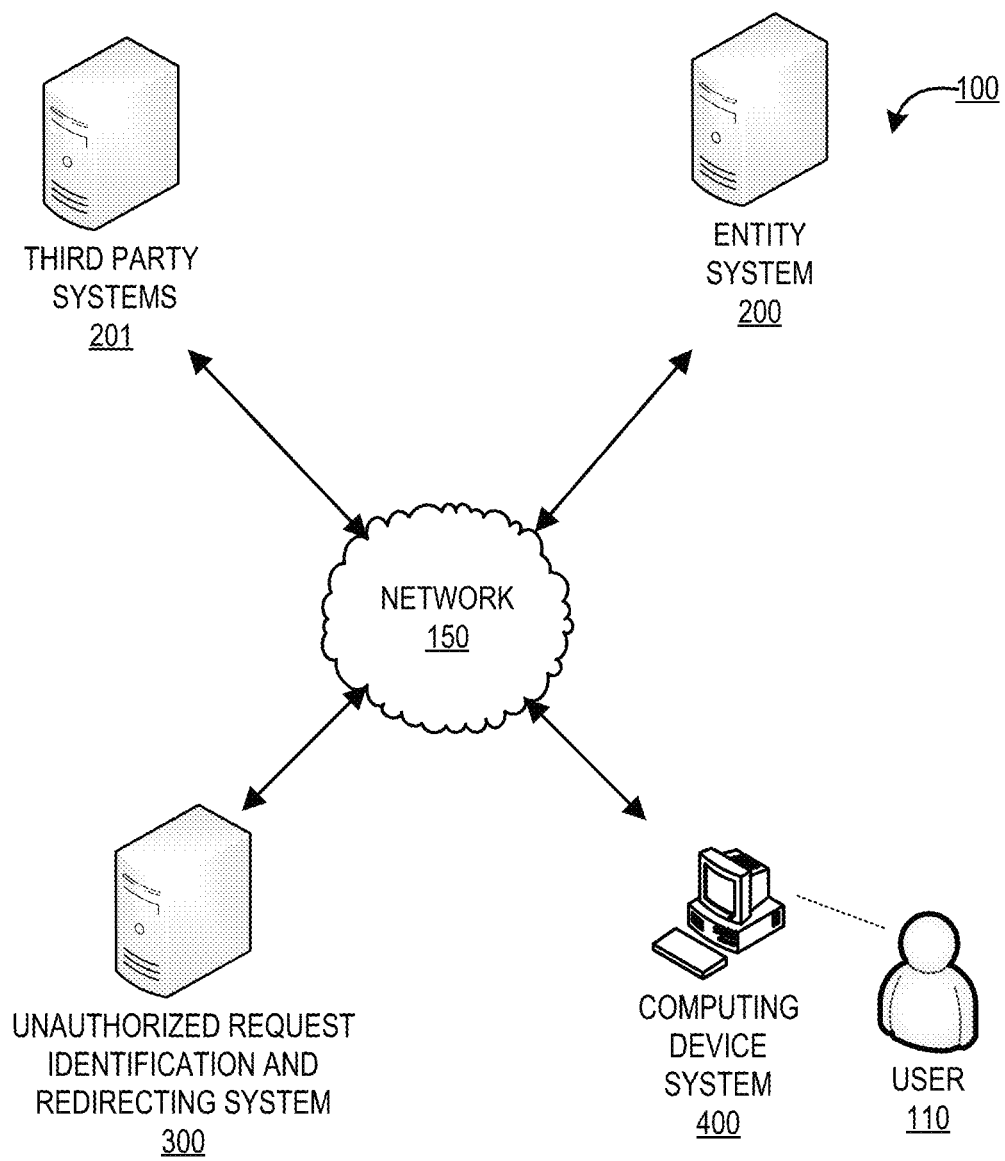
Figure 2:
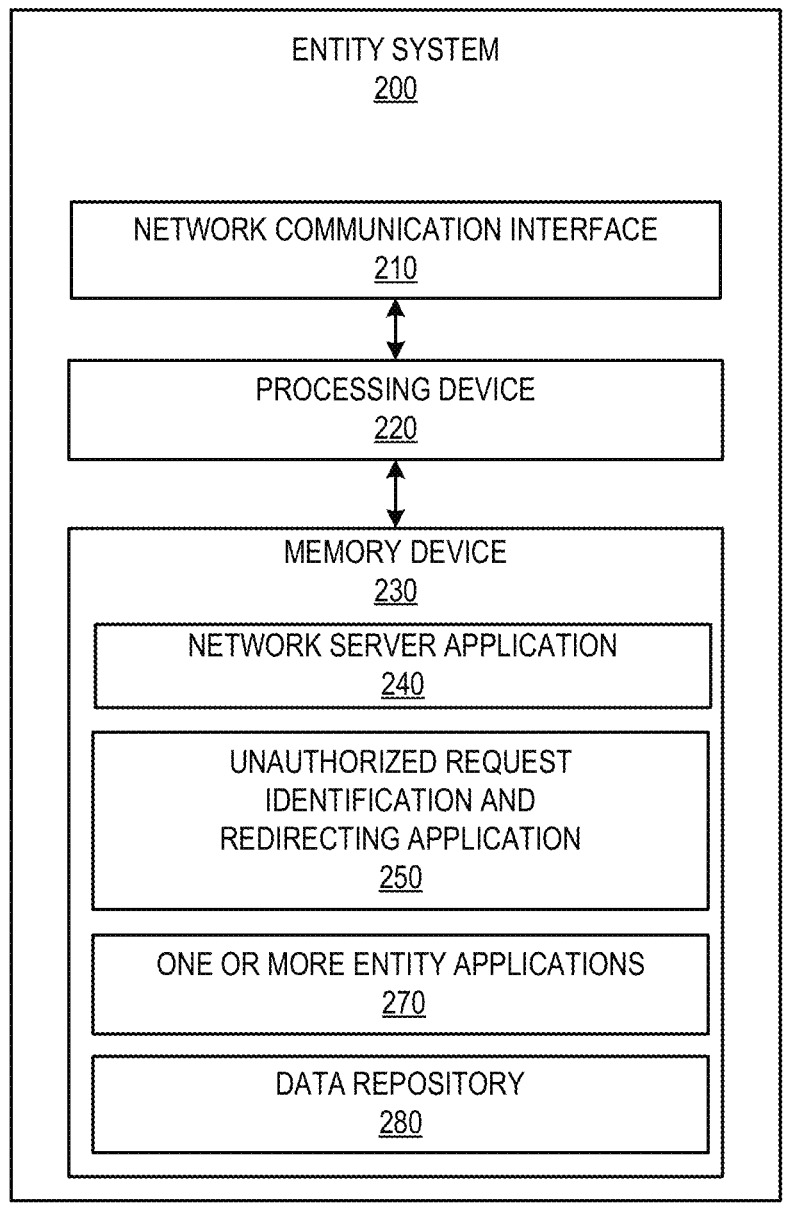
Figure 3:
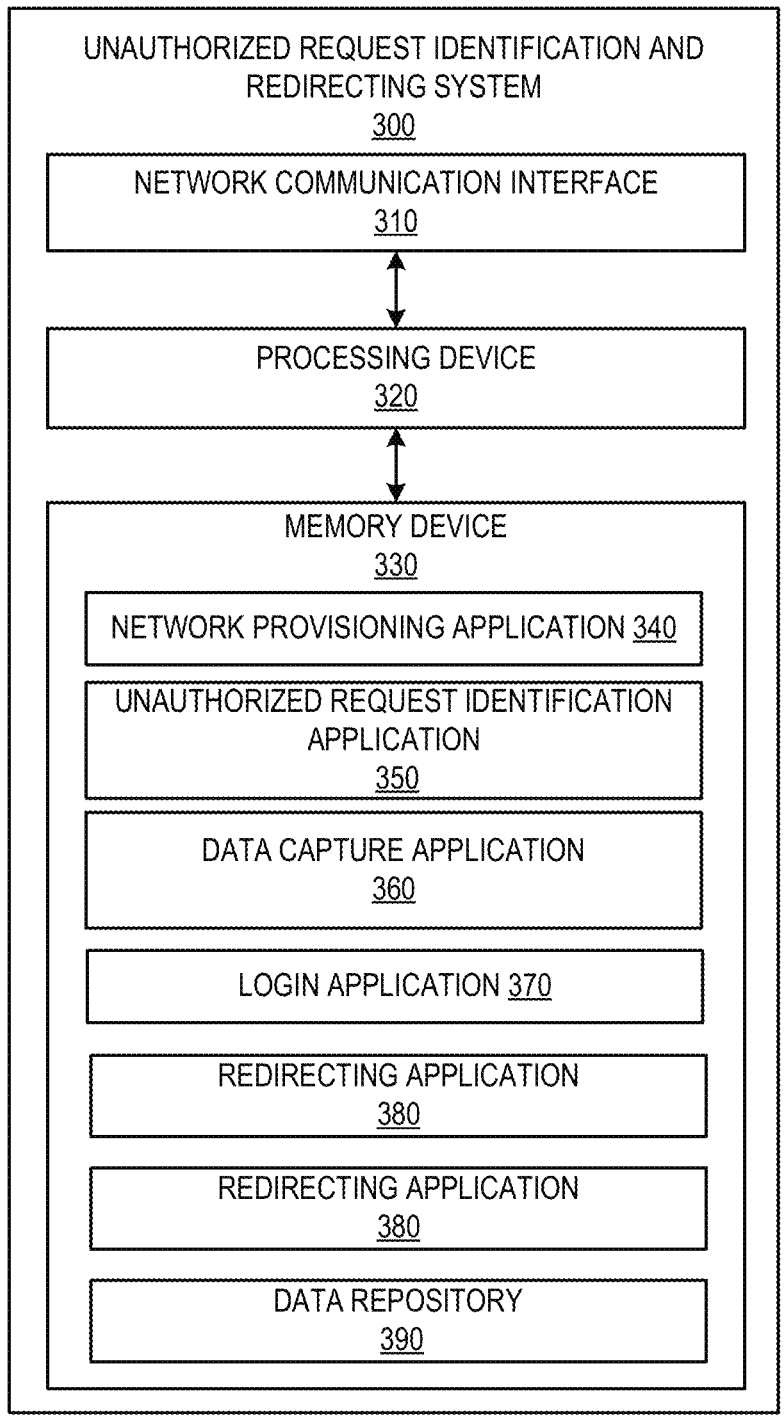
Figure 4:
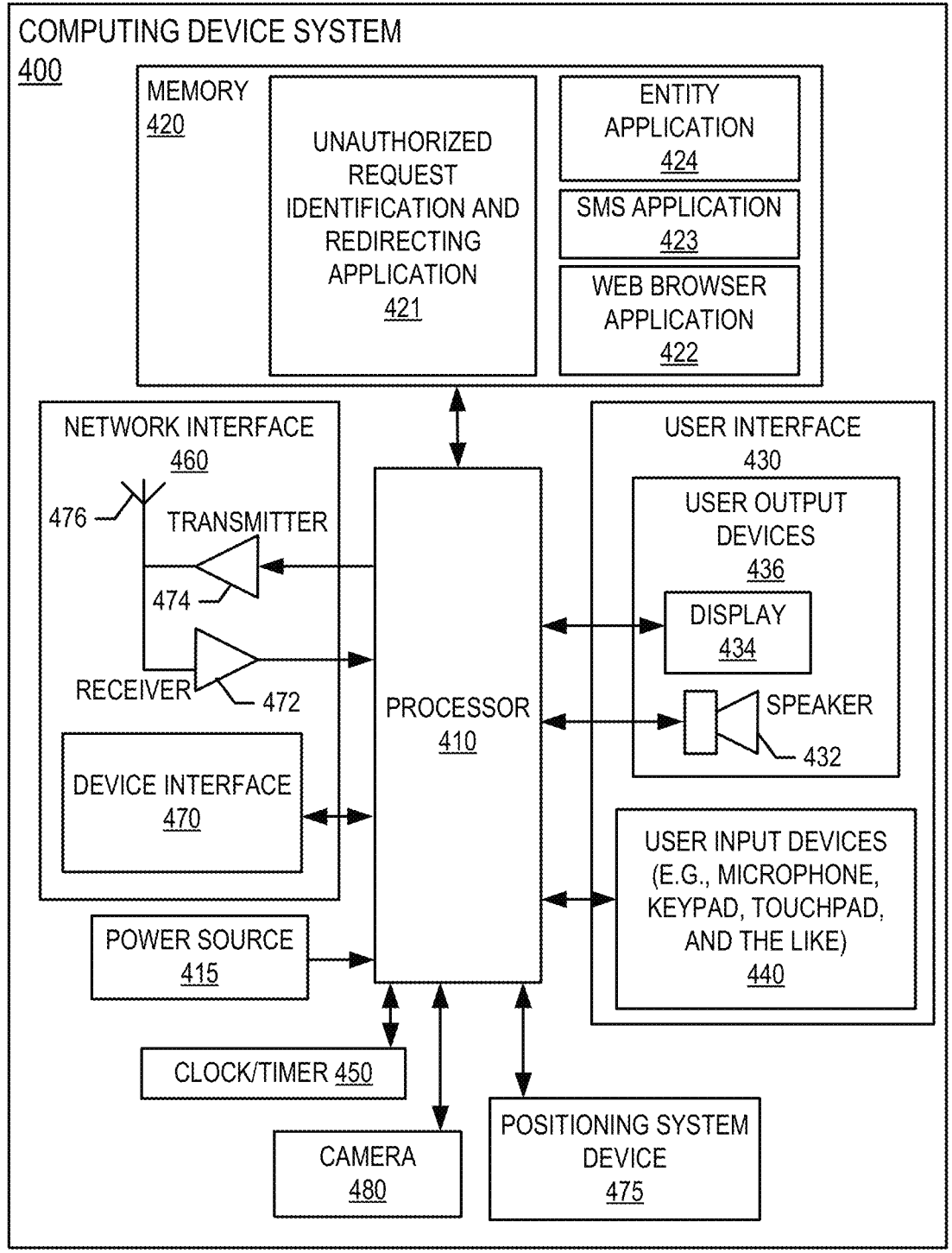
Figure 5:
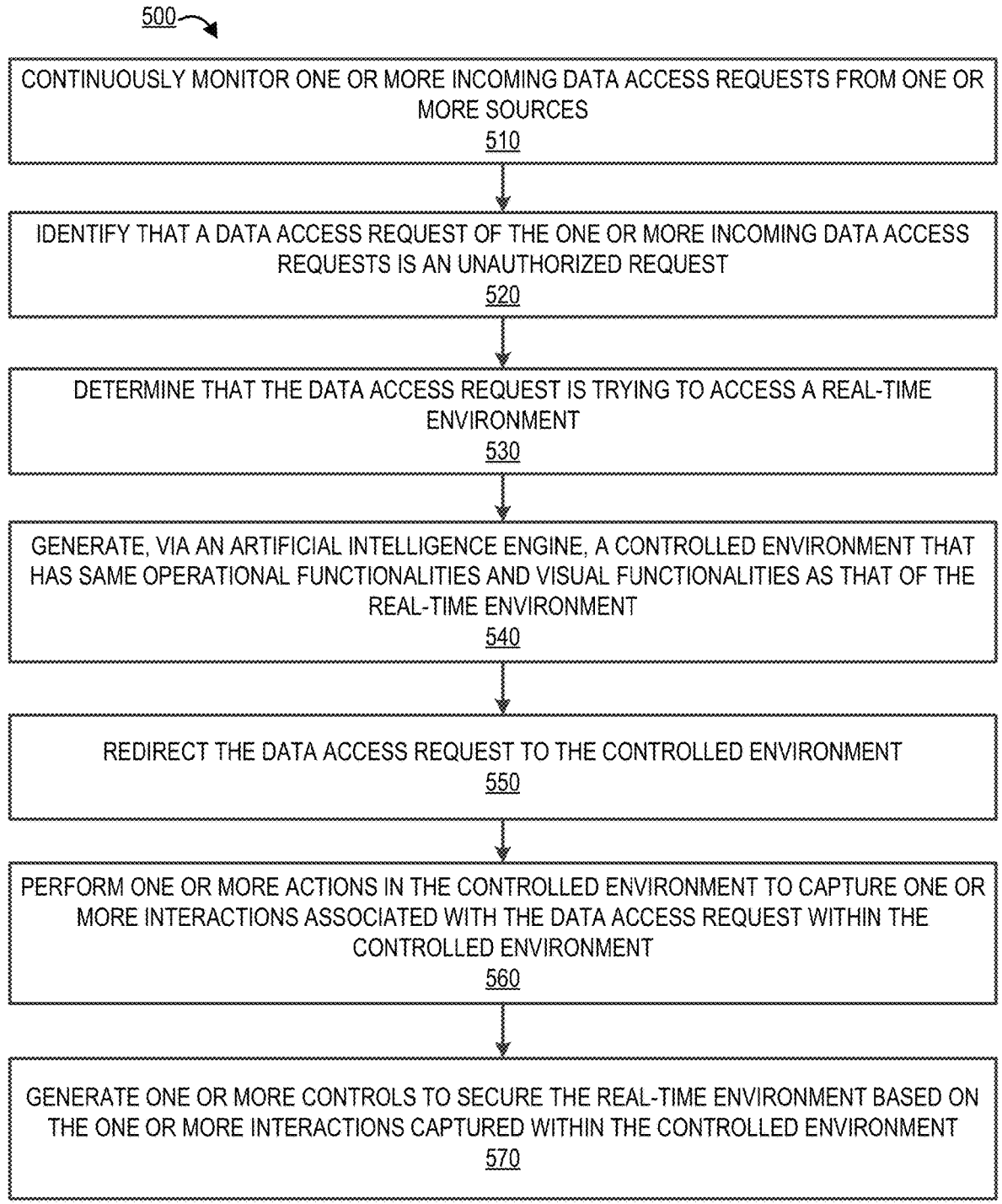

Having thus described embodiments of the invention in general terms, reference will now be made the accompanying drawings, wherein:

FIG. 1 provides a block diagram illustrating a system environment for identifying and redirecting incoming unauthorized data access requests, in accordance with an embodiment of the invention;

FIG. 2 provides a block diagram illustrating the entity system 200 of FIG. 1, in accordance with an embodiment of the invention;

FIG. 3 provides a block diagram illustrating an unauthorized request identification and redirecting system 300 of FIG. 1, in accordance with an embodiment of the invention;

FIG. 4 provides a block diagram illustrating the computing device system 400 of FIG. 1, in accordance with an embodiment of the invention; and FIG. 5 provides a process flow for identifying and redirecting incoming unauthorized data access requests, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which maintains secure data via one or more applications, databases, or the like. In some embodiments, the entity may be any institution which involves in financial transactions. In some embodiments, the entity may be a financial institution which may include any financial institutions such as commercial banks, thrifts, federal and state savings banks, savings and loan associations, credit unions, investment companies, insurance companies and the like. As described herein, a "user" may be an employee of the entity. As used here, the term "third party entity" may refer to any third party organization that provides information associated with compromised authentication credentials.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access, develop, manage, maintain, test, and/or use one or more applications provided by the entity and/or the system of the present invention. In some embodiments, the user may be an employee of the entity. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Typically, unauthorized users try to gain access to entity resources (e.g., databases, systems, applications, or the like) for accessing secure data present within entity resources. As such, there exists a need for system to identify incoming unauthorized data access requests and perform one or more remediation actions. The system of the present invention identifies such incoming unauthorized data access requests and redirects the data access requests to a controlled environment generated by the system.

FIG. 1 provides a block diagram illustrating a system environment 100 for identifying and redirecting incoming unauthorized data access requests, in accordance with an embodiment of the invention. As illustrated in FIG. 1, the environment 100 includes an unauthorized request identification and redirecting system 300, an entity system 200, a computing device system 400, and one or more third party systems 201. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200.

The entity system(s) 200 may be any system owned or otherwise controlled by an entity to support or perform one or more process steps described herein. In some embodiments, the entity may be any organization that involves in financial transactions. In some embodiments, the entity is a financial institution. In some embodiments, the entity may be a non-financial institution. In some embodiments, the entity may be any organization that manages, maintains, organizes, and/or stores any type of data. In some embodiments, the one or more third party systems 201 may be any organizations that provide information associated with compromised authentication credentials.

The unauthorized request identification and redirecting system 300 is a system of the present invention for performing one or more process steps described herein. In some embodiments, the unauthorized request identification and redirecting system 300 may be an independent system. In some embodiments, the unauthorized request identification and redirecting system 300 may be a part of the entity system 200.

The unauthorized request identification and redirecting system 300, the entity system 200, the computing device system 400, and the third party systems 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the unauthorized request identification and redirecting system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the unauthorized request identification and redirecting system 300, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution. In some embodiments, the entity system 200 is operated by an entity that is a non-financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an unauthorized request identification and redirecting application 250, one or more entity applications 270, and a data repository 280 comprising historical transaction data associated with one or more resource pools of users 110. The one or more entity applications 270 may be any applications developed, supported, maintained, utilized, and/or controlled by the entity that perform one or more organizational activities. The computer-executable program code of the network server application 240, the unauthorized request identification and redirecting application 250, the one or more entity application 270 to perform certain logic, data-extraction, and data-storing functions of the entity system 200 described herein, as well as communication functions of the entity system 200.

The network server application 240, the unauthorized request identification and redirecting application 250, and the one or more entity applications 270 are configured to store data in the data repository 280 or to use the data stored in the data repository 280 when communicating through the network communication interface 210 with the unauthorized request identification and redirecting system 300, and/or the computing device system 400 to perform one or more process steps described herein. In some embodiments, the entity system 200 may receive instructions from the unauthorized request identification and redirecting system 300 via the unauthorized request identification and redirecting application 250 to perform certain operations. The unauthorized request identification and redirecting application 250 may be provided by the unauthorized request identification and redirecting system 300.

FIG. 3 provides a block diagram illustrating the unauthorized request identification and redirecting system 300 in greater detail, in accordance with embodiments of the invention. As illustrated in FIG. 3, in one embodiment of the invention, the unauthorized request identification and redirecting system 300 includes one or more processing devices 320 operatively coupled to a network communication interface 310 and a memory device 330. In certain embodiments, the unauthorized request identification and redirecting system 300 is operated by an entity, such as a financial institution. In certain embodiments, the unauthorized request identification and redirecting system 300 is operated by an entity, such as a non-financial institution. In some embodiments, the unauthorized request identification and redirecting system 300 is owned or operated by the entity of the entity system 200. In some embodiments, the unauthorized request identification and redirecting system 300 may be an independent system. In alternate embodiments, the unauthorized request identification and redirecting system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the unauthorized request identification and redirecting system 300 described herein. For example, in one embodiment of the unauthorized request identification and redirecting system 300, the memory device 330 includes, but is not limited to, a network provisioning application 340, an unauthorized request identification application 350, data capture application 360, a login application 370, a redirecting application 380, and a data repository 390 comprising any data processed or accessed by one or more applications in the memory device 330. The computer-executable program code of the network provisioning application 340, the unauthorized request identification application 350, the data capture application 360, the login application 370, and the redirecting application 380 may instruct the processing device 320 to perform certain logic, data-processing, and data-storing functions of the unauthorized request identification and redirecting system 300 described herein, as well as communication functions of the unauthorized request identification and redirecting system 300.

The network provisioning application 340, the unauthorized request identification application 350, the data capture application 360, the login application 370, and the redirecting application 380 are configured to invoke or use the data in the data repository 390 when communicating through the network communication interface 310 with the entity system 200, and/or the computing device system 400. In some embodiments, the network provisioning application 340, the unauthorized request identification application 350, the data capture application 360, the login application 370, and the redirecting application 380 may store the data extracted or received from the entity system 200, and the computing device system 400 in the data repository 390. In some embodiments, the network provisioning application 340, the unauthorized request identification application 350, the data capture application 360, the login application 370, and the redirecting application 380 may be a part of a single application.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, an unauthorized request identification and redirecting application 421, and an entity application 424. These applications also typically instructions to a graphical user interface (GUI) on the display 430 that allows the user 110 to interact with the entity system 200, the unauthorized request identification and redirecting system 300, and/or other devices or systems. The memory 420 of the computing device system 400 may comprise a Short Message Service (SMS) application 423 configured to send, receive, and store data, information, communications, alerts, and the like via the wireless network 152. In some embodiments, the entity application 424 may be an online banking application. In some embodiments, the unauthorized request identification and redirecting application 421 provided by the unauthorized request identification and redirecting system 300 allows the user 110 to access the unauthorized request identification and redirecting system 300. In some embodiments, the entity application 424 provided by the entity system 200 and the unauthorized request identification and redirecting application 421 allow the user 110 to access the functionalities provided by the unauthorized request identification and redirecting system 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 provides a process flow for identifying and redirecting incoming unauthorized data access requests, in accordance with an embodiment of the invention. As shown in block 510, the system continuously monitors one or more incoming data access requests from one or more sources. The one or more sources may be entity sources (e.g., internal entity applications, systems, databases, or the like) or external sources. The one or more incoming data access requests may be requests to access real-time environments (e.g., production environments with real-time data) associated with entity applications, entity systems, entity databases, and/or the like.

As shown in block 520, the system identifies that a data access request of the one or more incoming data access requests is an unauthorized request. In some embodiments, the one or more incoming data access requests comprise authorized requests and unauthorized requests. In some embodiments, the system may identify that the data access request is an unauthorized request based on data received from one or more third party systems, wherein the data comprises information associated with compromised authentication credentials in one or more security data breaches. In some embodiments, the system may identify that the data access request is an unauthorized request based on determining that data access request is initiated from an anonymous Internet Protocol address. In some embodiments, the system may identify that the data access request is an unauthorized request based on determining that data access request is initiated from a known compromised proxy service. In some embodiments, the system may identify that the data access request is an unauthorized request based on determining that the data access request resulted in a timeout.

As shown in block 530, the system determines that the data access request is trying to access a real-time environment. In some embodiments, the system may determine the type of request based on information included in the data access request. In some embodiments, the system may determine that the data access request is trying to access a database with financial account numbers. In some embodiments, the system may determine that the data access request is trying to access a database with network credentials of one or more users of the entity.

As shown in block 540, the system generates, via an artificial intelligence engine, a controlled environment that has same operational functionalities and visual functionalities as that of the real-time environment. The controlled environment may be a honeypot environment that mimics the functions of the real-time environment that the data access request is trying to access. As shown in block 550, the system redirects the data access request to the controlled environment.

As shown in block 560, the system performs one or more actions in the controlled environment to capture one or more interactions associated with the data access request within the controlled environment. The one or more actions may comprise determining a type of the data access request, instantaneously generating, via an artificial intelligence engine, fictitious data based on the type of the data access request, and providing the fictitious data to the data access request within the controlled environment. For example, the system may determine that the data access request is trying to access a real-time database with financial account information and the system may generate fictitious account information that mimic the contents of the real-time database and may provide the fictitious account information to the data access request within the controlled environment.

In some embodiments, the system may also capture telemetry data associated with the data access request. Telemetry data captured by the system may comprise at least one of device cookies, operating system, screen resolution, browser information, Internet Protocol address, latitude and longitude data, and a Media Access Control (MAC) address associated with the data access request. In some embodiments, the system may utilize the telemetry data to identify a fingerprint of the data access request and may use the finger print to track historical requests and/or future requests that have the same fingerprint. In some embodiments, the system may generate alerts and transmit notifications one or more users based on identifying a request with the fingerprint identified by the system. In some embodiments, the system may immediately activate trigger responses based on detecting requests with the fingerprint identified by the system. In some embodiments, the system may determine that multiple unauthorized data access requests are trying to access the same entity resource (e.g., database, system, application, or the like) and may purge the database.

In some embodiments, the system may automatically generate one or more additional functionalities associated with the controlled environment based on the one or more interactions captured by the system, wherein the one or more additional functionalities support future interactions the data access request may make within the controlled environment. For example, if the data access request is trying to access an entity application, the system may initially generate five pages of the application based on the type of the data access request and may generate additional pages of the application within the controlled environment at different instances based on tracking one or more moves of the data access request after presenting the data access request with the fictitious information generated by the system. In some embodiments, the system may also instantaneously generate and present additional fictitious information required for future interactions of the data access request within the controlled environment.

As shown in block 570, the system generates one or more controls to secure the real-time environment based on the one or more interactions captured within the controlled environment. The one or more controls may comprise robust measures associated with building an application or a database, security mechanisms, or the like. In some embodiments, the system may also utilize the telemetry data and interaction data associated with unauthorized access requests to build controls within the controlled environment that allow the system to analyze complete potential of the data access requests. In some embodiments, the system purges the controlled environment after capturing the telemetry data and interaction data.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for identifying and redirecting incoming unauthorized data access requests, the system comprising:
    at least one network communication interface;
    at least one non-transitory storage device; and
    at least one processing device coupled to the at least one non-transitory storage device and the at least one network communication interface, wherein the at least one processing device is configured to:
        continuously monitor one or more incoming data access requests from one or more sources;
        identify that a data access request of the one or more incoming data access requests is an unauthorized request, wherein the data access request is associated with accessing data in a real-time environment;
        in response to identifying that the data access request is unauthorized, instantaneously generate a controlled environment that has same operational functionalities and visual functionalities as that of the real-time environment;
        redirect the data access request to the controlled environment;
        perform one or more actions in the controlled environment to capture one or more interactions associated with the data access request within the controlled environment; and
        automatically generate one or more controls to secure the real-time environment based on the one or more interactions captured within the controlled environment.

2. The system of claim 1, wherein the at least one processing device is configured to identify that the data access request is the unauthorized request based on data received from one or more third party systems, wherein the data comprises information associated with compromised authentication credentials in one or more security data breaches.

3. The system of claim 1, wherein the at least one processing device is configured to identify that the data access request is the unauthorized request based on determining that data access request is initiated from an anonymous Internet Protocol address.

4. The system of claim 1, wherein the at least one processing device is configured to wherein the at least one processing device is configured to identify that the data access request is the unauthorized request based on determining that data access request is initiated from a known compromised proxy service.

5. The system of claim 1, wherein the at least one processing device is further configured to capture telemetry data associated with the data access request, wherein the telemetry data comprises at least one of device cookies, operating system, screen resolution, browser information, Internet Protocol address, latitude and longitude data, and a Media Access Control (MAC) address associated with the data access request.

6. The system of claim 1, wherein performing the one or more actions comprises:
   determining a type of the data access request;
   instantaneously generating, via an artificial intelligence engine, fictitious data based on the type of the data access request; and
   providing the fictitious data to the data access request within the controlled environment.

7. A computer program product for identifying and redirecting incoming unauthorized data access requests, the computer program product comprising a non-transitory computer-readable storage medium having computer executable instructions for causing a computer processor to perform the steps of:
   continuously monitoring one or more incoming data access requests from one or more sources;
   identifying that a data access request of the one or more incoming data access requests is an unauthorized request, wherein the data access request is associated with accessing data in a real-time environment;
   in response to identifying that the data access request is unauthorized, instantaneously generating a controlled environment that has same operational functionalities and visual functionalities as that of the real-time environment;
   redirecting the data access request to the controlled environment;
   performing one or more actions in the controlled environment to capture one or more interactions associated with the data access request within the controlled environment; and
   automatically generating one or more controls to secure the real-time environment based on the one or more interactions captured within the controlled environment.

8. The computer program product of claim 7, wherein the computer executable instructions cause the computer processor to perform the step of identifying that the data access request is the unauthorized request based on data received from one or more third party systems, wherein the data comprises information associated with compromised authentication credentials in one or more security data breaches.

9. The computer program product of claim 7, wherein the computer executable instructions cause the computer processor to perform the step of identifying that the data access request is the unauthorized request based on determining that data access request is initiated from an anonymous Internet Protocol address.

10. The computer program product of claim 7, wherein the computer executable instructions cause the computer processor to perform the step of identifying that the data access request is the unauthorized request based on determining that data access request is initiated from a known compromised proxy service.

11. The computer program product of claim 7, wherein the computer executable instructions cause the computer processor to perform the step of capturing telemetry data associated with the data access request, wherein the telemetry data comprises at least one of device cookies, operating system, screen resolution, browser information, Internet Protocol address, latitude and longitude data, and a Media Access Control (MAC) address associated with the data access request.

12. The computer program product of claim 7, wherein performing the one or more actions comprises:
   determining a type of the data access request;
   instantaneously generating, via an artificial intelligence engine, fictitious data based on the type of the data access request; and
   providing the fictitious data to the data access request within the controlled environment.

13. A computer implemented method for identifying and redirecting incoming unauthorized data access requests, wherein the method comprises:
   continuously monitoring one or more incoming data access requests from one or more sources;
   identifying that a data access request of the one or more incoming data access requests is an unauthorized request, wherein the data access request is associated with accessing data in a real-time environment;
   in response to identifying that the data access request is unauthorized, instantaneously generating a controlled environment that has same operational functionalities and visual functionalities as that of the real-time environment;
   redirecting the data access request to the controlled environment;
   performing one or more actions in the controlled environment to capture one or more interactions associated with the data access request within the controlled environment; and
   automatically generating one or more controls to secure the real-time environment based on the one or more interactions captured within the controlled environment.

14. The computer implemented method of claim 13, wherein identifying that the data access request is the unauthorized request is based on data received from one or more third party systems, wherein the data comprises information associated with compromised authentication credentials in one or more security data breaches.

15. The computer implemented method of claim 13, wherein identifying that the data access request is the unauthorized request is based on determining that data access request is initiated from an anonymous Internet Protocol address.

16. The computer implemented method of claim 13, wherein identifying that the data access request is the unauthorized request is based on determining that data access request is initiated from a known compromised proxy service.

17. The computer implemented method of claim 13, wherein the method comprises capturing telemetry data associated with the data access request, wherein the telemetry data comprises at least one of device cookies, operating system, screen resolution, browser information, Internet Protocol address, latitude and longitude data, and a Media Access Control (MAC) address associated with the data access request.

18. The computer implemented method of claim 13, wherein performing the one or more actions comprises:

determining a type of the data access request;

instantaneously generating, via an artificial intelligence engine, fictitious data based on the type of the data access request; and providing the fictitious data to the data access request within the controlled environment.

19. The system of claim 1, wherein the at least one processing device is further configured to purge the controlled environment in response to capturing the one or more interactions associated with the data access request within the controlled environment.

20. The computer program product of claim 7, wherein the computer executable instructions cause the computer processor to perform the step of purging the controlled environment in response to capturing the one or more interactions associated with the data access request within the controlled environment.

\* \* \* \* \*